United States Patent Office.

WILLIAM C. TAIT, OF ALEXANDRIA, LOUISIANA.

Letters Patent No. 104,791, dated June 28, 1870.

IMPROVED MEDICAL COMPOUND.

The Schedule referred to in these Letters Patent and making part of the same.

*To all whom it may concern:*

Be it known that I, WILLIAM C. TAIT, of Alexandria, in the parish of Rapides and State of Louisiana, have invented a new and useful Improvement in Medical Compound; and I do hereby declare that the following is a full, clear, and exact description thereof, which will enable others skilled in the art to make and use the same.

This invention relates to a new and valuable improvement in a compound to be used as a medicine for coughs and for all affections of the lungs or bronchial tubes, and other affections of the human system, proceeding from colds, exposure, or other causes.

In carrying out my invention or discovery, I make use of the ingredients hereinafter named, in about the proportions specified, and in the manner described as follows, viz:

Benzoic acid, one ounce; balsam tolu, five ounces; liquid storax, five ounces; gum ammoniac, five ounces; gum opium, one-half ounce; gum myrrh, two ounces; alcohol, one gallon.

The above gums and other articles are put into the alcohol, and the mixture is allowed to stand for the space of about fourteen days. It is then filtered, and one-half gallon of clarified honey and a half gallon of oxymel squills are added, and then, to every pint of the mixture thus made, I add four minnims of oil of bitter almonds.

A dose of this medicine for an adult is about two teaspoonfuls every three hours, but the dose is variable according to the condition of the patient.

A dose for children of from six to eight years of age is from twenty to thirty drops, variable, according to age and condition, for all children.

Having thus described my invention,

I claim as new and desire to secure by Letters Patent—

The above-described compound, substantially as and for the purposes specified.

WILLIAM C. TAIT.

Witnesses:
MIRES ROSENTHAL,
C. R. COLLINS.